United States Patent

[11] 3,587,445

| [72] | Inventor | Paul J. Kircher<br>Mansfield, Ohio |
| [21] | Appl. No. | 815,899 |
| [22] | Filed | Apr. 14, 1969 |
| [45] | Patented | June 28, 1971 |
| [73] | Assignee | Westinghouse Electric Corporation<br>Pittsburgh, Pa. |

[54] ELECTRICALLY OPERATED FOOD COOKER
7 Claims, 5 Drawing Figs.

[52] U.S. Cl............................................. 99/331,
99/400, 99/422, 99/425, 99/446
[51] Int. Cl............................................. A47j 27/62
[50] Field of Search................................... 219/(Inquired);
99/331, 332, 369, 400, 422, 425,
426, 444, 446, 423, 385, 390, 393

[56] References Cited
UNITED STATES PATENTS
1,533,241  4/1925  Forshee...................... (99/385UX)
1,540,628  6/1925  Hurxthal et al............... 99/393X
2,080,171  5/1937  Fairbanks et al.............. 99/349
2,131,278  9/1938  Gough.......................... 99/385
2,570,374  10/1951  Pompa......................... 99/426X
2,690,496  9/1954  Suprano....................... (99/331UX)
3,352,227  11/1967  Litman.......................... 99/349X
3,466,998  9/1969  Musgrove...................... 99/349
1,729,937  10/1929  Ginder......................... 99/390

*Primary Examiner*—Billy J. Wilhite
*Attorneys*—F. H. Henson, E. C. Arenz and B. B. Sklar, Jr.

ABSTRACT: A cooking appliance suitable for, but not limited to, the cooking of bacon. The appliance is characterized by the provision of a removable, generally U-shaped cooking plate over which the bacon is draped and which promotes grease drainage. A pair of readily removable and partially mounted covers are also provided which serve to readily accommodate loading the unloading of the cooker as well as cleaning thereof and retard spattering of grease.

ELECTRICALLY OPERATED FOOD COOKER

BACKGROUND OF THE INVENTION

This invention relates, in general, to cooking appliances and, more particularly, to appliances for cooking bacon or the like.

Heretofore, foods such as bacon have almost always been cooked in a pan or on the upper surface of a griddle. When such utensils are employed the bacon becomes curled, such that, turning thereof, is required in order to accomplish proper cooking thereof. Furthermore, since the bacon eventually becomes grease laden, it is necessary to provide separate means to remove excess grease after the bacon has been removed from the utensil.

Accordingly, the general object of this invention is to provide a new and improved cooking appliance which cooks bacon uniformly.

It is a more particular object of this invention to provide a new and improved bacon cooker wherein the grease is automatically drained from the bacon.

Another object of this invention is to provide a cooking utensil for bacon or the like comprising a number of components so assembled as to facilitate loading and unloading of bacon and draining of grease from the bacon.

BRIEF SUMMARY OF THE INVENTION

Briefly, the above cited objects are accomplished by the provision of a framelike support structure having a substantially U-shaped cooling plate removably supported thereon. A pair of cover members are supported by end caps forming parts of the support structure, in a closed position, such that they contain spattering of grease. In their open position they provide ready access to the cooking plate for placement of bacon thereon. The plate and cove members are so constructed as to be retained without fasteners, consequently, they may be simply lifted from the support structure for cleaning.

Further objects and advantages of the present invention will become apparent when considered in view of the drawings and detailed description forming a part thereof.

DESCRIPTION OF THE DRAWINGS

FIG. 5 is a circuit diagram for the device including a schematic drawing of the timing mechanism.

DETAILED DESCRIPTION OF THE PREFERRED EMBODIMENT

Figure 1:
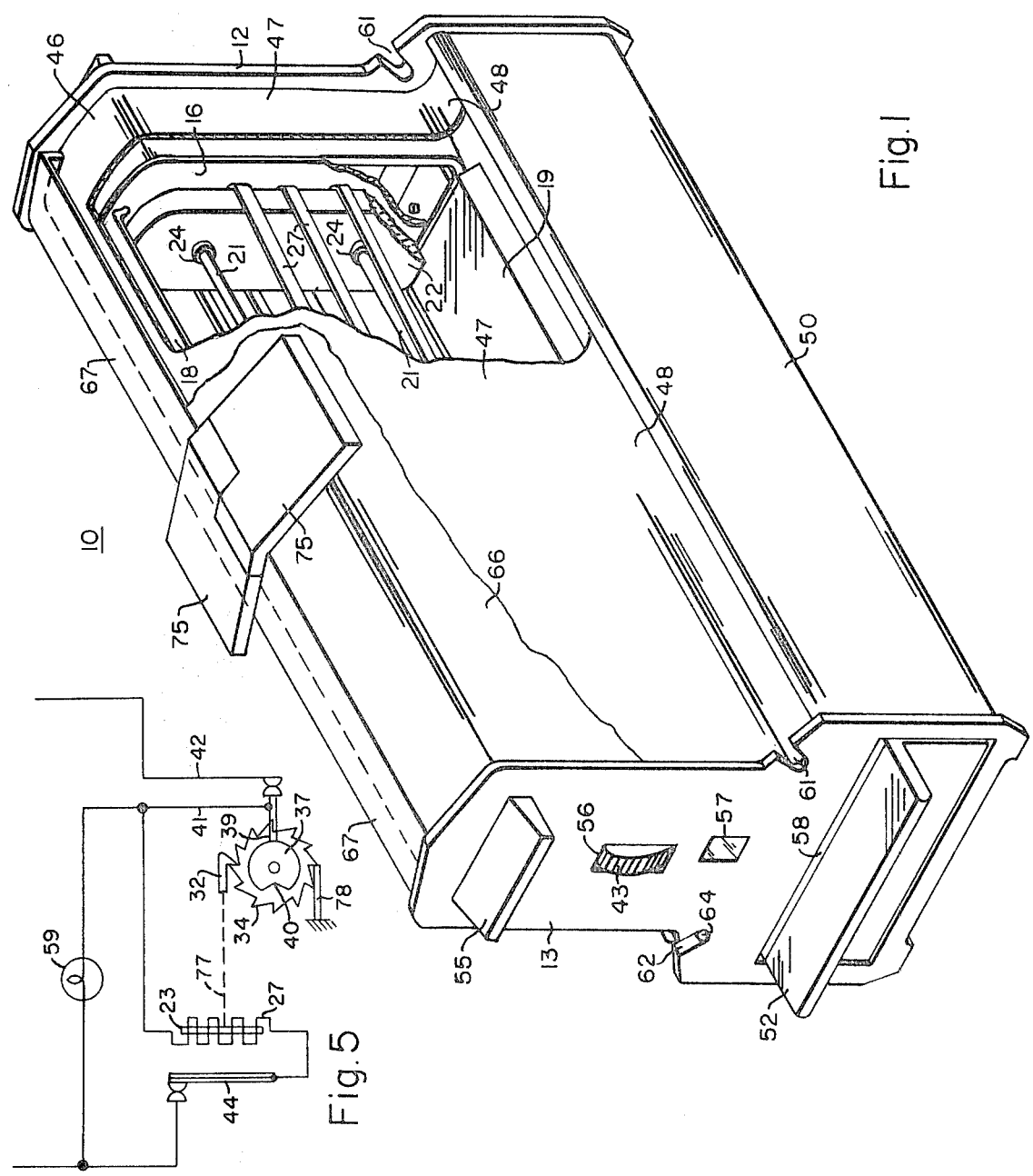
FIG. 1 is a perspective view of a bacon cooker incorporating the invention.
Figure 2:
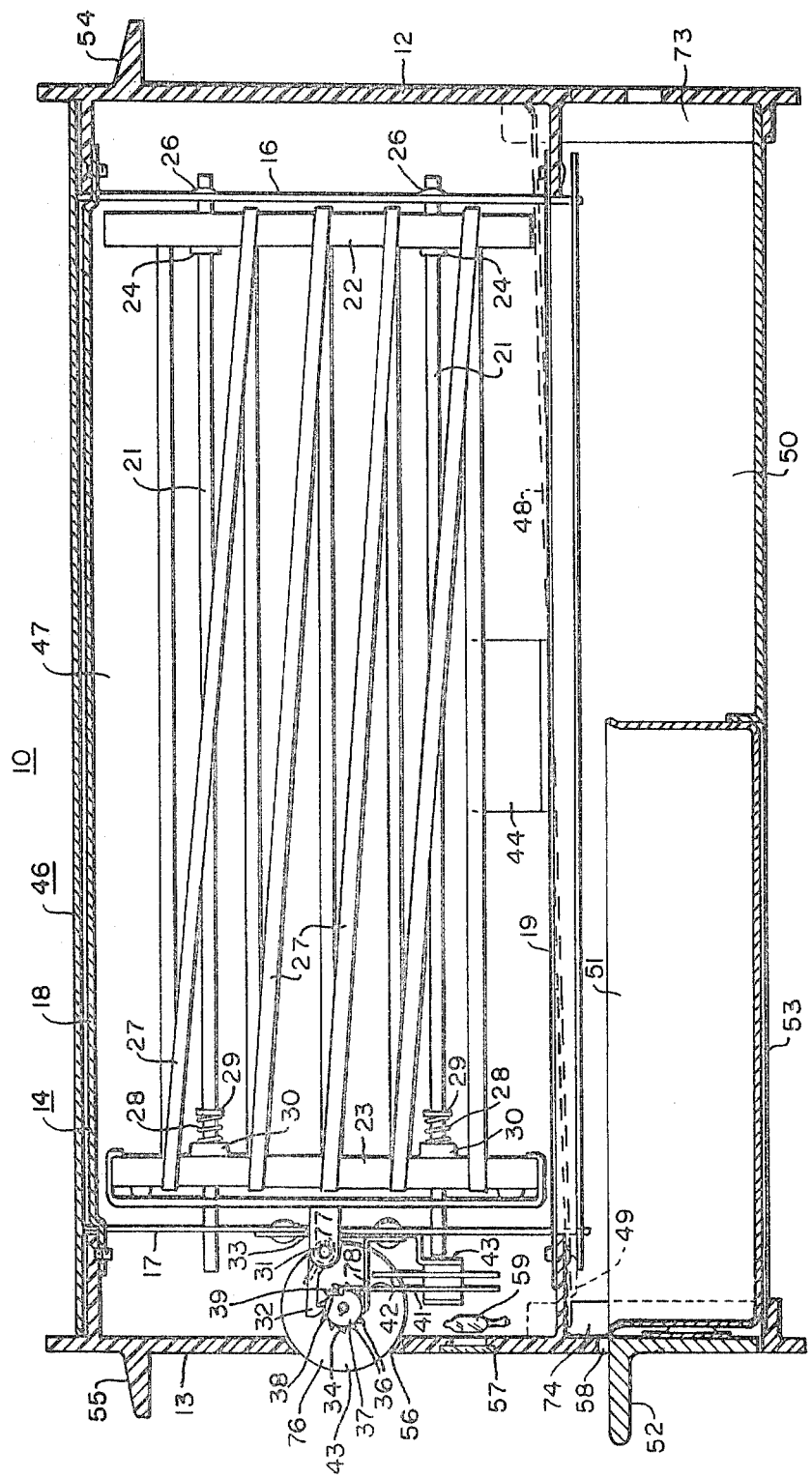
FIG. 2 is a side elevational view, partly in elevation and partly in section, of the device shown in FIG. 1.

Referring now to the drawings, especially FIGS. 1 and 2, reference character 10 designates generally a bacon cooker comprising a housing structure generally indicated at 11.

The housing structure 11 comprises a pair of nonmetallic end caps 12 and 13 attached to a framelike support structure 14. The support structure consists of spaced apart vertically oriented members 16 and 17 and spaced apart and horizontally disposed crossmembers 18 and 19 (see FIG. 2).

A pair of horizontally disposed rods 21 extending between members 16 and 17 are received in apertures appropriately spaced in the members 16 and 17. Rods 21 also extend through and support vertically extending insulating blocks 22 and 23 generally adjacent the support members 16 and 17. Both rods 21 and at least one of the blocks (in this instance block 22) are stationarily mounted as by a collar member 24 which abuts block 22 and a retaining spring washer 26 which abuts support member 16, whereas the other block 23 is mounted for limited sliding movement on the rods 21. Block 22 is resiliently urged in one direction by a coil spring 28 carried by each rod and in an abutting relationship between stationary collars 29 of each rod and hubs 30 of the block member 23.

A ribbon heater structure 27 wrapped around the insulator blocks 22 and 23 provides the heat for the cooking of the bacon as will be discussed hereinafter. It will be understood that as the heater structure is energized, it expands along the longitudinal axis of the cooker or, as viewed in FIG. 2, horizontally and in the plane of the paper. The coil spring 28 carried by each rod 21 between the collar 29 of the rod and the block member 23 moves the block 23 to the left as viewed in FIG. 2 as the heater structure 27 expands.

Such movement of the block 23, as discussed above, also imparts movement to a pawl structure 31 which is carried thereby, such that a fingerlike component 32 moves, generally, along the longitudinal axis of the cooker 10. The free end of the pawl structure 31 extends through an opening 33 in the support member 17 and cooperates with a ratchet wheel 34 rotatably mounted between two arms 35 carried by the support member 17. The fingerlike component 32 rides on and engages one at a time, ratchet wheel teeth 36, of which there are 12. The teeth 36 are provided on the circumference of the wheel 34 and while there are presently contemplated 12 such teeth, any number may be employed.

The wheel 34 has a hub 37 which is provided with a cam surface 38 on which a follower 39 rides. The follower 39 forms an integral part of a contact carrying arm 41 of a switch 42 mounted by a bracket 43 to the support 17. The cam surface maintains the switch contacts closed throughout its circumference except for a notch 40 which permits movement of the follower 39 sufficient to open the switch. The switch 42 is included in a circuit comprising the heater structure 27 and a thermomotive element in the form of a normally closed bimetal thermostat 44, which senses ambient temperature in the area of the heater structure and opens the circuit at a predetermined maximum temperature.

A substantially U-shaped cooking plate 46 is supported by the end caps 12 and 13 in such a manner that vertical sidewalls 47 thereof, lie adjacent the heater structure 27. The lower edges of the plate 46 are curved as indicated at 48 to provide sloped troughs thereat. The sloped troughs serve to direct the flow of grease toward one end of the plate, where apertures 49 are provided and through which the grease passes. A removable grease container 51 having a handle 52 is supported beneath the apertures 49 by a bottom cover plate 53. A pair of side panels 50 are received in grooves provided in the end caps 12 and 13 and are thereby held in place intermediate the end caps 12 and 13.

The end caps 12 and 13 are both provided with carrying handles 54 and 55 while the latter end cap is provided with apertures 56, 57 and 58 through which, respectively, the wheel 43 extends, an indicator bulb 59 shines and through which the grease container 51 is installed. The end caps 12 and 13 each are provided with a pair of recesses 61 and 62 for receiving trunnions 63 and 64 of cover structures 66 and 67.

Figure 4:
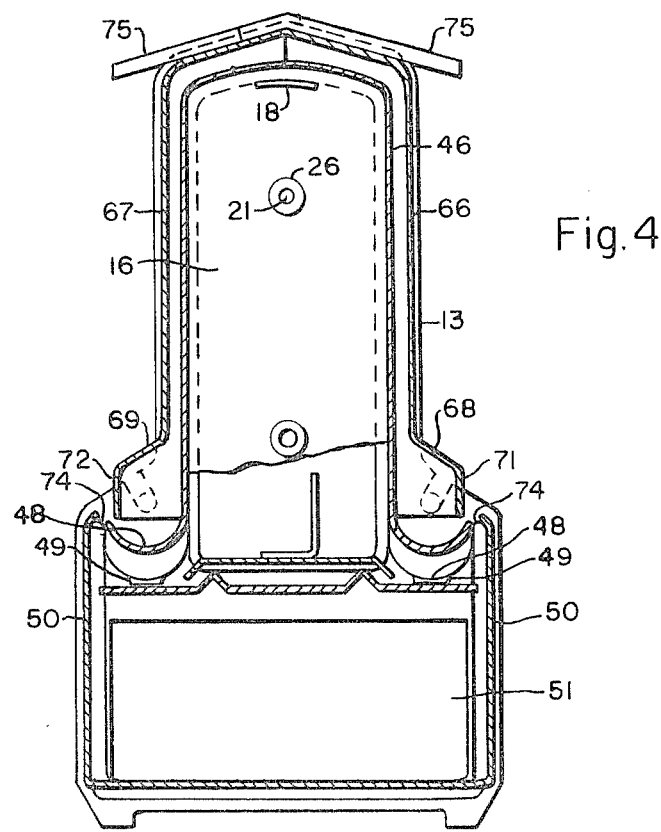
FIG. 4 is a view of the opposite end of the device from that shown in FIG. 3.

The cover structures 66 and 67 are contoured as indicated at 68 and 69 to provide surfaces 71 and 72 (see FIG. 4) which engage surfaces 73 and 74 of the end caps 12 and 13 to hold the cover structures in an open position for installation of bacon on the cooker plate 46. Each cover structure is provided with one-half of a combination of lock and handle assembly 75 which holds the covers together during cooking.

OPERATION

Figure 3:
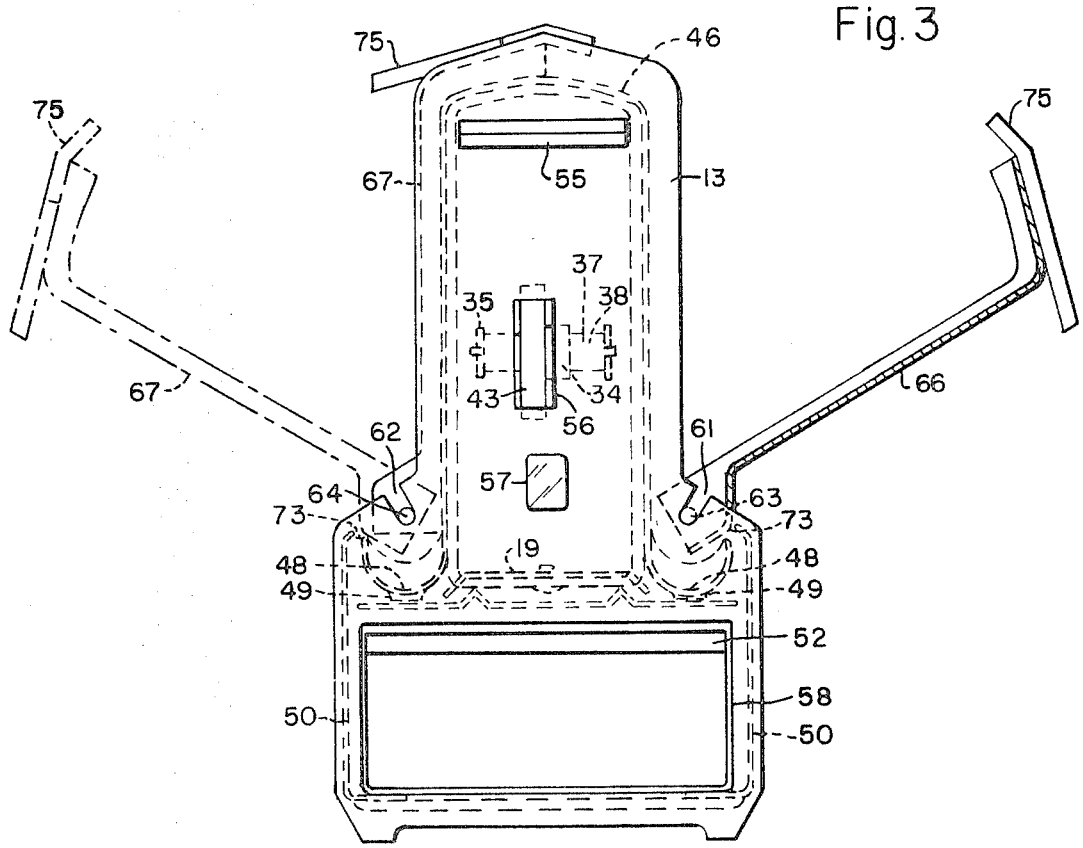
FIG. 3 is an end view of the device shown in FIG. 1, but with its covers removed.

To load the cooker 10, the cover structures 66 and 67 are spread apart, as shown in FIG. 3 or completely removed. Bacon is placed on the cooking plate 46 and the covers are reclosed. Incidentally, the cooking plate may be coated with a nonstick material, for example, polytetrafluoroethylene.

Referring now to FIG. 5 the ratchet wheel is integrally connected to and manually rotatable by a knurled wheel 76 which has the numbers 1 to 12 printed on the circumference thereof for convenience in setting the wheel at a desired position depending on how "done" the bacon is to be cooked and corresponds to the teeth on the ratchet. Manual rotation of the wheel 76 from its off position where the switch 42 is open corresponding to follower 39 in the cam notch, closes the switch whereupon the heater structure 27 becomes energized. As the heater structure 27 expands the springs 28 move the block member 23 and the pawl 31 to the left, as viewed in FIG. 2. As the fingerlike component 32 moves to its extreme left position, it is moved upward, against the bias of a spring 77, by one of the teeth 36 and drops behind the next tooth due to the force of the spring 77. When the predetermined maximum temperature, as determined by the calibration of the thermomotive element 44, has been reached, the circuit to the heater structure is opened and the heater is allowed to cool down, causing it to contract to its initial position, the effect of which is to move the block 23 back to the right, and consequently, move the pawl element 31 to the right which causes the wheel 76 to rotate one increment. The bimetal upon sensing the relatively cool ambient temperature would again close, energizing the circuit causing the expansion and subsequent contraction to again repeat. Assuming the wheel 76 was set at six, then the foregoing would take place six times before the cam notch position would correspond with the follower 39 such that the switch 42 would be opened and the operation of the cooker terminated. A locking pawl or detent 78 prevents backward rotation of the wheel 34.

Since numerous changes may be made in the above apparatus and different embodiments may be made without departing from the spirit thereof, it is intended that all matter contained in the foregoing description or shown in the accompanying drawings be interpreted as illustrative and not in a limiting sense.

I claim:

1. In a bacon cooker, in combination:
frame support structure;
heater structure supported by said support structure;
a cooking plate supported about said heater structure, said plate comprising a substantially inverted U-shaped configuration having substantially vertically disposed leg portions;
means removably connected to said frame structure for receiving grease from said plate; and
a pair of cover members pivotally supported adjacent said cooking plate to provide a cover structure.

2. Structure as specified in claim 1 including means forming a part of said cover members cooperating with said support structure for holding said cover members in the opened position for loading of said cooker.

3. Structure as specified in claim 2 wherein, each of said cover members comprises trunnions and said support structure comprises trunnion receiving notches.

4. Structure as specified in claim 3 including, means for controlling the cycle of operation of said bacon cooker, said means being responsive to the ambient temperature in the area of said heater structure.

5. Structure as specified in claim 1 wherein:
the leg portions of said plate are bent at their lower extremities to provide troughs for receiving grease draining from said leg portions; and
each of said troughs has an aperture in the lower end thereof which communicates with said grease receiving means.

6. In a food cooking device, in combination:
framelike support structure;
a cooking plate supported by said support structure, said cooking plate comprising an inverted substantially U-shaped configuration;
means supported by said support structure and enclosed by said cooking plate for heating said cooking plate;
means disposed beneath said cooking plate in proper registration determined by said support structure for catching grease dripping from said cooking plate; and
a pair of cover structures, each having a pair of trunnions received in opened slots in said framelike support structure.

7. Apparatus for cooking bacon comprising:
frame support structure;
heater means supported by said support structure;
a cooking plate supported about said heater means, said plate having an inverted U-shaped configuration with substantially vertically disposed leg portions;
means connected to said support structure below said cooling plate for receiving grease from said cooking plate;
means supported by said support structure about said cooking plate to enclose said plate when cooking food thereon;
switch means connected to said heater means for actuating said heater means when in a closed position; and
adjustable timing means for controlling the switch means, said timing means being responsive to the ambient temperature in the area of said heater means to open said switch and terminate operation of said heater means in accordance with a predetermined positioning of said timing means.